(12) United States Patent
Hicks (10) Patent No.: US 11,506,177 B1
(45) Date of Patent: Nov. 22, 2022

(54) WIND AND SOLAR SYSTEMS GENERATING THREE PHASE ELECTRICAL ENERGY

(71) Applicant: Daniel K Hicks, Red Jacket, WV (US)

(72) Inventor: Daniel K Hicks, Red Jacket, WV (US)

( * ) Notice: Subject to any disclaimer, the term of this patent is extended or adjusted under 35 U.S.C. 154(b) by 0 days.

(21) Appl. No.: 17/367,373

(22) Filed: Jul. 4, 2021

(51) Int. Cl.
*F03D 9/00* (2016.01)
*H02J 3/38* (2006.01)
*F03D 9/11* (2016.01)

(52) U.S. Cl.
CPC ............ *F03D 9/007* (2013.01); *F03D 9/11* (2016.05); *H02J 3/381* (2013.01); *H02J 2300/28* (2020.01)

(58) Field of Classification Search
CPC .......... F03D 9/007; F03D 3/005; F03D 3/062; F03D 9/11; F03D 15/00; H02J 3/381; H02J 2300/24; H02J 2300/28; H02S 10/12; H02S 40/38; F05B 2220/706; F05B 2220/708; F05B 2240/214; F05B 2260/232; F05B 2260/4031; F05B 2280/2006; F05B 2280/6003
See application file for complete search history.

(56) References Cited

U.S. PATENT DOCUMENTS

| | | | | |
|---|---|---|---|---|
| 2012/0073456 | A1* | 3/2012 | Lyle | B30B 15/161 100/48 |
| 2014/0035509 | A1* | 2/2014 | Baruh | B65G 67/02 414/373 |
| 2015/0108763 | A1* | 4/2015 | Yogev | F03D 9/17 290/55 |
| 2015/0233353 | A1* | 8/2015 | Bertony | F03D 7/06 416/147 |

* cited by examiner

*Primary Examiner* — Julio C. Gonzalez
(74) *Attorney, Agent, or Firm* — Dinsmore & Shohl LLP; Monika L. Jaensson, Esq.

(57) ABSTRACT

The disclosed technology provides a system and methods for transforming kinetic energy from wind and solar energy from sunlight into three phase electrical energy for local use and available to supply to electrical grids. The system includes a solar panel system and a wind system, which through a gearbox translates kinetic energy from the wind into hydraulic energy in a hydraulic circuit. One or more generators are coupled with the hydraulic circuit to translate the hydraulic energy into three phase electrical energy. In embodiments, a pump motor runs off of a rechargeable battery to supply hydraulic energy to one of the generators when the wind is insufficient to provide sufficient hydraulic energy to the generator. The rechargeable battery may be recharged by diverting energy from, for example, the solar panel system.

19 Claims, 11 Drawing Sheets

WIND AND SOLAR SYSTEMS GENERATING THREE PHASE ELECTRICAL ENERGY

BACKGROUND

The disclosed technology generates three phase electricity by capturing kinetic energy from wind using a wind system coupled with a hydraulic pump and a hydraulic circuit having one or more generators, and by capturing solar energy through the use of a solar panel system. By means of the disclosed technology, energy may be harnessed from the wind with wind speeds as low as 4 mph, up to or in excess of 300 mph, without having to stop during high or low wind speeds. Further, the overall height of embodiments of the system herein disclosed is significantly less than 200' above ground level, and therefore generally not required to register with the Federal Aviation Administration. Electrical energy from the system and heat from the generators may be used to operate and heat an adjacent greenhouse in winter months or for like purposes. Likewise, energy generated by the system may be supplied to the electrical grid.

GENERAL DESCRIPTION

The disclosed technology provides a system for transforming kinetic energy from wind and solar energy from sunlight into three phase electrical energy. The system includes a wind system, a gearbox, a hydraulic pump and a hydraulic circuit, one or more generators, and a solar panel system.

The wind system of the disclosed technology includes a plurality of arced plates affixed by spokes to a central shaft, the wind system having an axis of rotation perpendicular to the ground surface. The arced plates are affixed by means of the spokes to the central shaft so that the longitudinal axes of the arced plates are parallel with the central shaft (system axis of rotation). The central shaft of the wind system is affixed to one of the gears of the gearbox so that as the wind causes the arced plates of the wind system to rotate, the rotation produces rotation of the central shaft and the gear to which it is affixed, causing corresponding rotation of at least one other gear of the gearbox and an output shaft of the gearbox.

The output shaft of the gearbox is coupled with the hydraulic pump, translating the mechanical power of the shaft rotation into hydraulic energy within the hydraulic circuit. Positioned within the hydraulic circuit are the one or more generators, which receive hydraulic fluid (e.g., hydraulic oil) from the hydraulic pump and generate three phase electricity. The hydraulic circuit may include one or more flow control valves to control the supply and flow pressure of pumped hydraulic fluid to the generators. Finally, the solar panel system generates electrical energy from solar energy.

A hydraulic pump motor may be coupled with one of the generators to pump hydraulic fluid to the generator when the hydraulic pressure being supplied by the hydraulic pump is below an operating threshold for the generator (e.g., <10 gpm). Electrical energy may be supplied to the pump motor by a rechargeable battery system, which may be recharged by electrical energy diverted from the solar panel system.

Energy produced by the system and heat from the generators may be used to operate and heat an adjacent greenhouse, or for similar purposes. For example, energy so generated may be used to operate heating, ventilation and air cooling systems, lighting systems, and otherwise provide electricity about the facility. Energy produced by the system may also be supplied to the electrical grid.

The disclosed technology further regards a wind system capable of generating three phase electricity in wind speeds as low as 4 mph and in excess of 55 mph, or even 300 mph. This system includes a wind system having a plurality of arced plates affixed by spokes to a central shaft, wherein the shaft's axis of rotation is perpendicular to the ground surface. The arced plates are affixed by means of the spokes to the central shaft so that the longitudinal axes of the arced plates are parallel with the central shaft's axis of rotation. Coupled with the wind system is a gearbox having two or more gears, with an output shaft, one of the gears being affixed to the central shaft of the wind system so that as the wind causes the arced plates of the wind system to rotate, the rotation produces rotation of the central shaft and the gear to which it is affixed, causing corresponding rotation of at least one other gear of the gearbox and the output shaft of the gearbox. The gearbox translates the mechanical power of the shaft rotation into hydraulic energy within a hydraulic circuit by means of a hydraulic pump coupled with the output shaft of the gearbox. One or more generators receive high pressure hydraulic fluid from the hydraulic pump and generate three phase electricity.

The disclosed technology further includes a method of generating electricity, including the steps of (1) converting kinetic energy from wind into three phase electrical energy by means of a wind system coupled with a gearbox, the gearbox being coupled with a hydraulic pump in a hydraulic circuit, operable to provide hydraulic pressure to one or more generators; and (2) converting solar energy to electrical energy by means of a solar panel system.

In this method, the wind system includes a plurality of arced plates affixed by spokes to a central shaft, the system and the shaft having an axis of rotation perpendicular to the ground surface. The arced plates are affixed by means of the spokes to the central shaft so that the longitudinal axes of the arced plates are parallel with the axis of the central shaft. Coupled with the wind system is a gearbox including two or more gears, with an output shaft, one of the gears being affixed to the central shaft of the wind system so that as the wind causes the arced plates of the wind system to rotate, the rotation produces rotation of the central shaft and the gear to which it is affixed, causing corresponding rotation of at least one other gear of the gearbox and the output shaft of the gearbox. The rotation of the output shaft of the gearbox translates into hydraulic energy by means of a hydraulic pump, coupled with the output shaft of the gearbox. The one or more generators receive high pressure hydraulic fluid from the hydraulic pump and generate three phase electricity.

DETAILED DISCLOSURE

The disclosed technology provides three phase electricity, generating power by capturing kinetic energy from wind using a wind system coupled with a hydraulic pump and one or more generators, and by capturing solar energy through the use of a solar panel system.

Figure 1:
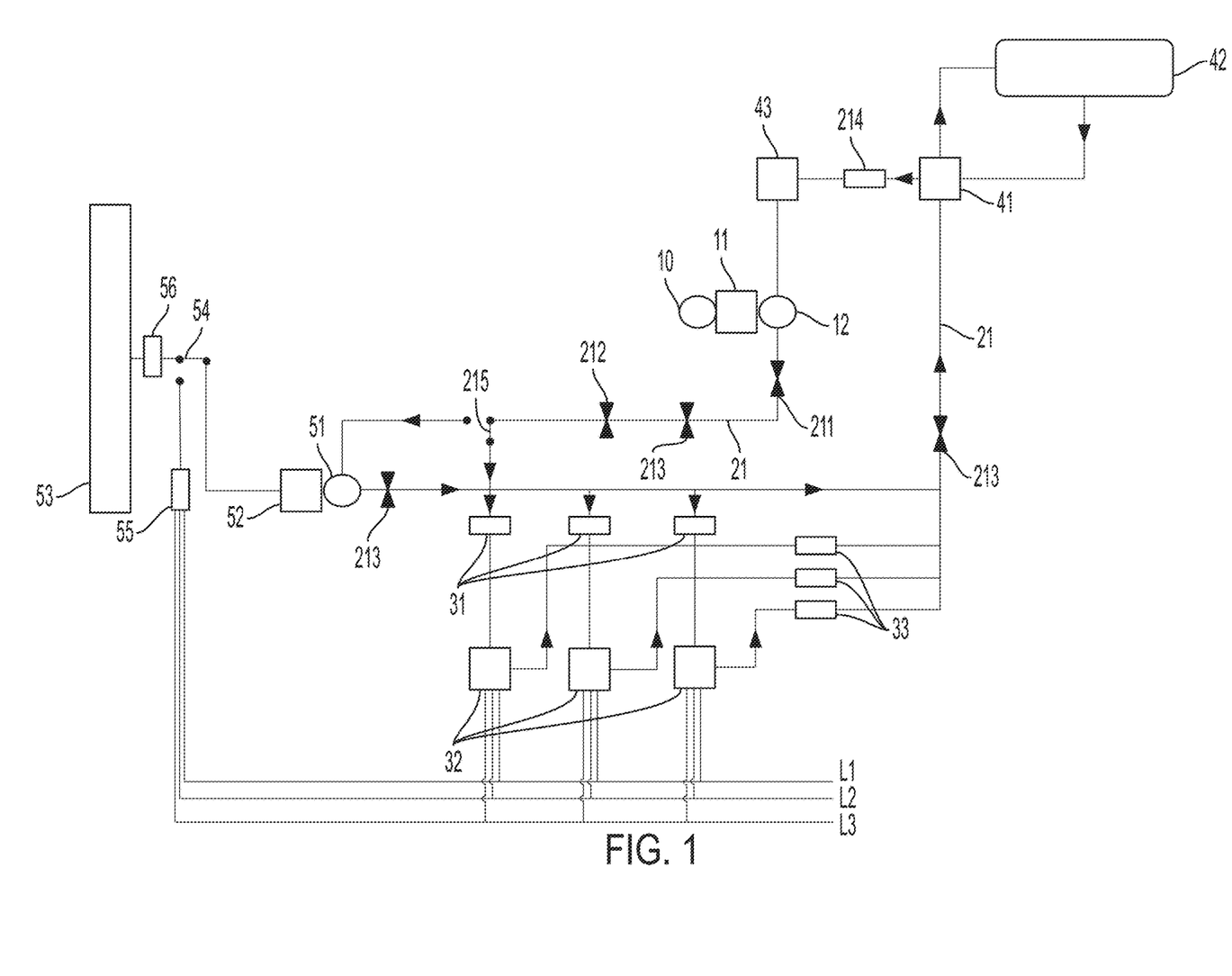
FIG. 1 is a diagram of an embodiment of the disclosed technology.
Figure 2:
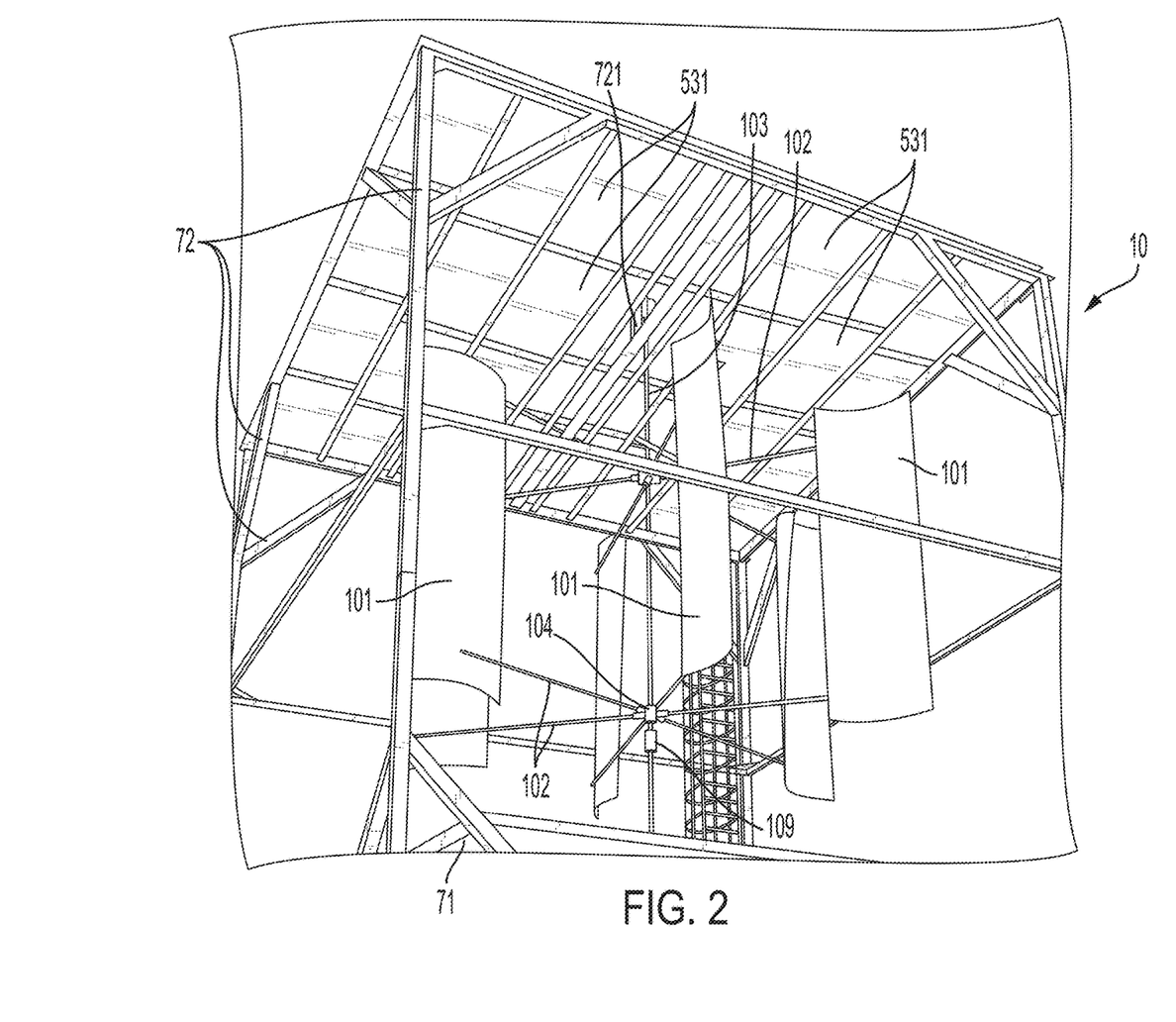
FIG. 2 is a perspective view of an embodiment of components of the disclosed technology, namely the wind system, the solar panels and supporting structure.
Figure 3A:
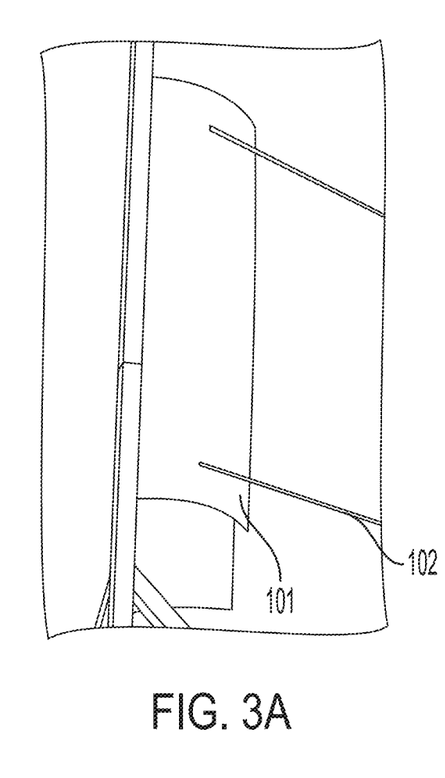
FIG. 3A is a perspective view of an embodiment of an arced plate affixed to a pair of spokes, as shown in FIG. 2.
Figure 3B:
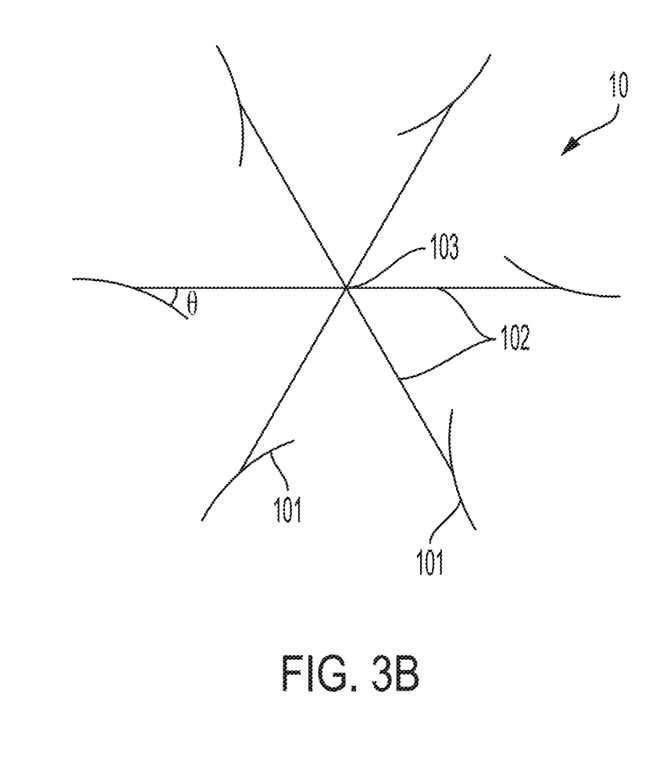
FIG. 3B is a top view of an embodiment of the arced plates of the disclosed technology as affixed to the central shaft of the wind system by means of the spokes.

As shown in the embodiment of FIG. 1, the disclosed technology includes a wind system 10 coupled with a gearbox 11, such that as the wind causes the plates of the wind system to rotate, the rotation produces corresponding rotation of the gears of the gearbox. As shown in FIGS. 2, 3A, and 3B, the wind system 10 includes a plurality of arced plates 101 each affixed by a pair of spokes 102 to a central shaft 103, the system and the central shaft having an axis of rotation perpendicular to the ground. In the embodiment shown, six arced plates are affixed about the central shaft so that the longitudinal axis of each of the plates is parallel with the rotational axis of the central shaft; in other embodiments, four to eight arced plates, or more, may be used.

The plates 101 may be made from carbon fiber, or a metal, such as A514 steel, or other suitable materials as would be known or are hereafter developed. In an embodiment, the plates have a thickness of 7"-9", or 8", a width of between 4'-6', or 5', a length of between 26'-30', or 28'. The arc angle of the plates may be 10°-20°, or 15°. The spokes are affixed to the back of the plates, as shown in FIGS. 2, 3A and 3B, wherein the angle θ between the backside of the plate and the spoke at the point of affixation is 4°-6°, or 5°, as shown in FIG. 3B. In an embodiment the spokes may have a 2" diameter with a length of between about 10'-18', or 12'-16', and the central shaft may have a 3" diameter, with a height of between about 50'-60', or about 54'.

Figure 4A:
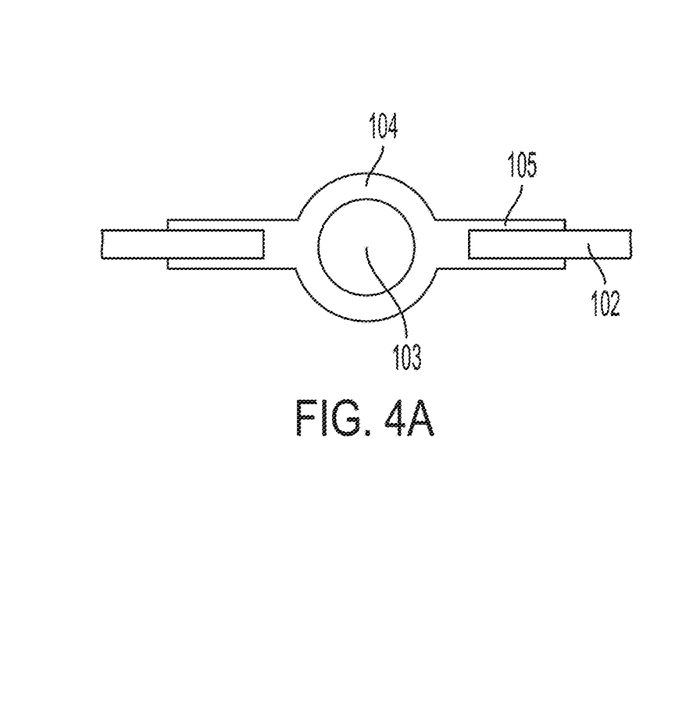
FIG. 4A is a view of an embodiment of the spoke and central shaft of the wind system.
Figure 4B:
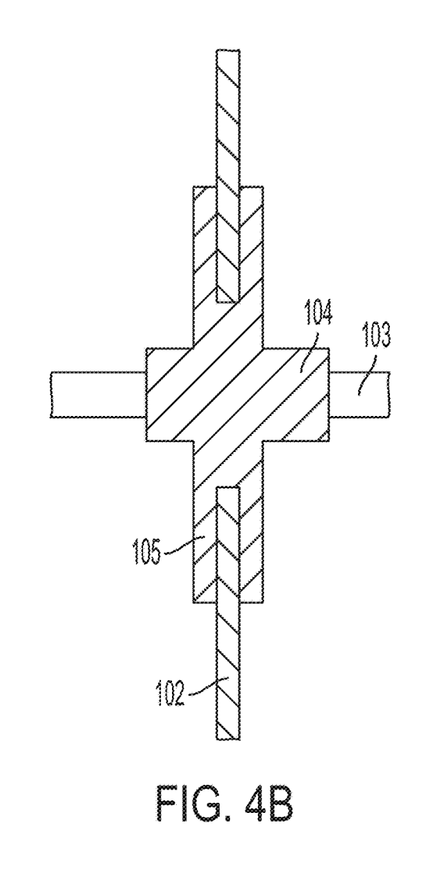
FIG. 4B is another view of the embodiment of the spoke and central shaft of FIG. 4A.
Figure 4C:
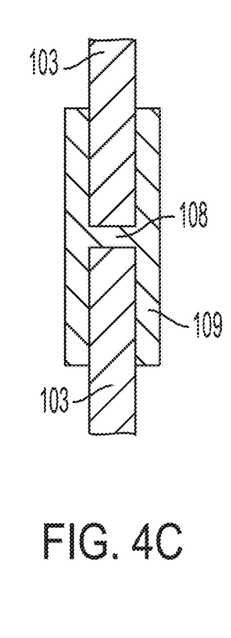
FIG. 4C is a view of an embodiment of a coupling of the central shaft of the wind system.

To secure the spokes 102 to the central shaft 103, as shown in FIGS. 4A, 4B and 4C, a pair of cylindrical support structures 104 may be supported on the central shaft 103 (with the central shaft extending through the aperture of the cylindrical support structures). The cylindrical support structures may have an outer diameter of 7" and an inner diameter of 3". A plurality of sleeves 105 extend radially from the cylindrical support structure, each sleeve having a length of about 7", with a 6" long bore centrally located from an end of each sleeve to receive the spoke 102. The sleeves may have an inner diameter of 2" and an outer diameter of 3", forming a 1" wall, to secure the spokes within the sleeves. Although only two sleeves are shown in FIGS. 4A and 4B, in an embodiment with six spokes supporting one end of each of six plates, six sleeves would be positioned about each cylindrical support structure.

The central shaft may comprise multiple segments, coupled together as shown in FIG. 4C at the linking support structure 109, wherein the linking support structure includes a plate 108 dissecting the aperture thereof to receive and support one segment of the central shaft on one end of the structure and another segment on the other end of the structure.

The sleeves 105 may be integrally formed with or secured to the support structures 104 by welding or similar affixation means. Likewise the spokes and central shaft segments may be affixed to the sleeves or support structure, respectively, by welding or similar affixation means. The central shaft segment or segments are secured within the corresponding apertures of the support structures 104 and 109 so that the shaft rotates with, but not independent of, the support structures.

In this configuration, as wind passes through the wind system it pushes against one or more of the plates, causing them to move about the axis of rotation and rotate the central shaft 103. Thereby, rotational speeds of 35-40 rpm may be achieved, and a wind system constructed in accordance with the disclosed technology may be about 60' from the ground surface, or in any event at least less than 200' above the ground surface. With this low height, the system does not interfere with airplane flight patterns or bird/bat migration, and can operate at both low and high wind speeds (e.g., ~4 mph, >55 mph).

The central shaft 103 is affixed to a first gear of the gearbox 11, such that the first gear 106 rotates with the rotation of the central shaft. The gearbox further comprises at least one additional gear 106 coupled with the first gear (at their respective teeth) to translate the rotation of the central shaft 103 into mechanical power of an output shaft 107 of the gearbox, affixed to one of the additional gear(s). Suitable gearboxes useful in the disclosed technology may have a 10:1 gear ratio, and generate rotational speed of the output shaft up to 400 rpm. An exemplary, simple gearbox useful in the disclosed technology is shown in FIG. 9.

Figure 9:
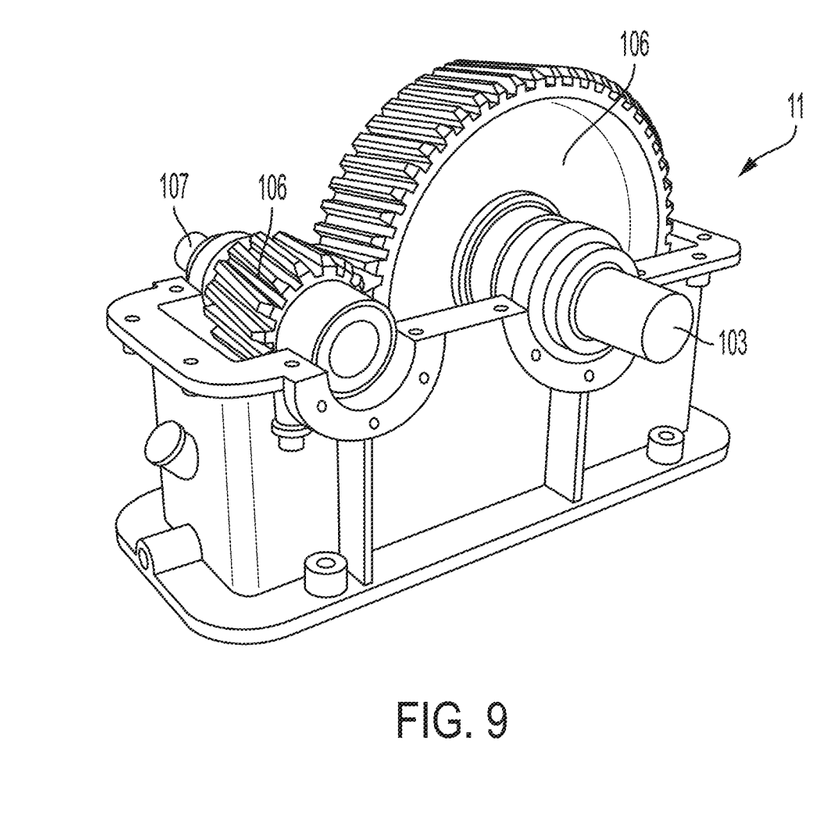
FIG. 9 is a view of a simple gear system useful in the disclosed technology.

As shown in FIGS. 1 and 9, the output shaft 107 of the gearbox is coupled with a hydraulic pump 12, for example by means of a jaw coupling. By this configuration, the mechanical power of the gear rotation is thereby translated into hydraulic pressure within a hydraulic circuit 21. Suitable hydraulic pumps include hydro static piston pumps, such as Kawasaki 80 cc axial piston pumps, and use hydraulic oil. By the configuration described herein, the hydraulic pump may draw hydraulic fluid from a fluid tank 43 and generate pump output flow of up to 50 gallons per minute (gpm) of hydraulic fluid. A flow meter 211 may be positioned in the circuit to measure the pump outflow of hydraulic fluid; in the event that the flow is below a certain predefined threshold (such as, for example, in the event of a leaking or broken hose in the circuit), the meter can sense the condition and alert a user or an automated system to stop the hydraulic pump and some of the other components of the hydraulic circuit until the system can be repaired.

As hydraulic fluid is pumped by the hydraulic pump 12 in the hydraulic circuit 21, it is supplied to one or more generators 32. One or more check valves 212 can be provided in the circuit to control the direction of flow of the hydraulic fluid, and prevent back flow. Flow control valves 31 control the supply and flow pressure of pumped hydraulic fluid to the generator(s). In an exemplary embodiment, such as the embodiment shown in FIG. 1, a first flow control valve supplies 10 gpm hydraulic fluid to a first generator designed and configured to operate on 10 gpm hydraulic pressure input flow. Excess fluid not directed to the first generator is diverted to a second control valve, which supplies 15 gpm to a second generator designed and configured to operate on 15 gpm hydraulic pressure input flow. Finally, excess fluid not directed to the second generator is diverted to a third control valve, which supplies up to 25 gpm (or more) hydraulic fluid to a third generator designed and configured to operate on up to 25 gpm (or more) hydraulic pressure input flow. The fluid from the generators and any additional fluid, inclusive of fluid not sufficient to run the next sequential generator, is supplied back to the hydraulic circuit. Three phase electricity generated by each of the generators is then transmitted to the grid, by means of lines L1, L2 and L3 (or otherwise diverted to operate components of the system or other machinery in adjacent facilities).

Suitable generators for use in the disclosed technology include three phase generators, such as hydraulic driven AC generator systems sold by Harrison Hydra-Gen. A torque gauge may be coupled with each generator to measure torque on the equipment and report the same locally or remotely; further, one or more pressure gauges 213 may be positioned throughout the circuit, which may sense and report the hydraulic pressure to a central location so that the system may be monitored, by users and/or in an automated system.

After the generator(s) generate the three phase electricity, the hydraulic fluid exiting the generators may have a high temperature, e.g. in excess of 98° F. Therefore, the fluid may pass through one or more apparatus for cooling the fluid before continuing on its full cycle through the circuit 21. For example, and as shown in FIG. 1, fluid from the generator(s) may be cooled in the hydraulic circuit by one or more fans 33 which supply air to cool the hydraulic fluid. In some embodiments, the fans reduce the temperature of the hydraulic fluid to about 97° F.

An additional or alternative cooling apparatus may be a heat exchanger 41, through which the fluid passes to cool (or further cool) it to a temperature of about 60° F. Suitable heat exchangers for use with the disclosed technology include double tube, shell in tube, tube in tube, and plate heat exchangers. In one embodiment, the heat exchanger may be coupled with an underground water storage tank 42, such as one which collects rain water. Suitable underground water storage tanks include underground rainwater harvesting tanks. By this configuration, water having a temperature of between about 50°-55° F. may be supplied to the heat exchanger, and returned underground for cooling. A pump may be provided to circulate water from the storage tank through the heat exchanger, and may supply it back to the storage tank (or discharge it into the environment). The cooling apparatuses and the pump, as well as other monitoring or controlling elements of the system of the disclosed technology, may receive electric power generated by the generators.

Once cooled by the heat exchanger, the hydraulic fluid may be circuited to a fluid tank 43 (e.g., 100 gallon tank) and held there until drawn by the hydraulic pump 12 in the cycle as herein described. In some embodiments a flow valve 214 may be positioned between the cooling apparatus(es) and the fluid tank, to control the flow of fluid into the tank. Thereby, for example, the flow can be controlled to at or below 60 psi so that the fluid is held in the cooling apparatus(es) for a longer period of time, and is thereby cooled to a lower temperature.

If insufficient wind is present to operate at least one of the generators (i.e., the hydraulic pump produces fluid flow less than 10 gpm), a DC pump motor 51 is provided to draw hydraulic fluid through the circuit 21 and deliver it under pressure to the first generator, so power flow to the grid is uninterrupted. As shown in FIG. 1, when fluid flow is less than 10 gpm (as detected by a pressure gauge 213), the hydraulic fluid is diverted to the pump, and supplied to the first generator. Circuiting the hydraulic fluid through the pump (or alternatively directly to the generators as hereinabove described) may be controlled by a switch 215, manually controlled or automated upon detection of low fluid flow pressure. Suitable pump motors include a 15 hp DC motor. A soft starter may be coupled with the motor to continuously control the three-phase motor's voltage supply during the start-up phase, so that the motor is adjusted to the generator's load behavior, and accelerated smoothly. Power is provided to the DC pump motor by means of a battery system 52, such as a 128 VDC lead-acid rechargeable battery. A battery level sensor coupled with a switch may sense the charge in the battery, and when it detects the battery level as being below a certain, pre-defined threshold, may stop the operation of the pump motor.

In this embodiment the battery system is recharged by a solar panel system 53, such as a 480 volt, three phase system. Suitable panels include Astro Energy's 340 W-355 W polycrystalline PV module panels, sold under the tradename AstroHalo. The panels 531 may be positioned on the plates of the wind system, or elsewhere on the housing (e.g., on top of an open structure 71, 72 supporting the wind system, as shown in FIG. 2) or in one or more arrays near the system. When positioned on the plates, the solar power gathered by the panels is sent to collecting rings positioned on the wind system central shaft, which then transmit the same to micro inverters.

A control switch 54 is provided between the solar panel system and the battery system, to determine whether energy generated by the solar panel system is diverted to the battery system to recharge the battery, or transmitted to the grid. The control switch may be coupled with the battery level sensor so that when the battery charge is sensed below a certain, predefined level, energy from the solar panel system is sent to the battery; when it is above the predefined charge, energy from the solar panel system is sent to the grid.

All electricity from the solar system which is not used to recharge the battery may be provided to the grid by means of a three-phase grid-tie PV inverter 55, such as that provided by Solar Edge under model SE10KUS. A power optimizer 56, such as those offered by Solar Edge, may be used to optimize the performance of the solar panels even under periods of severe shading.

In some embodiments, the generators and other components (e.g., motors, battery system, hydraulic pump and circuit, heat exchangers, etc.) are housed underground, to limit noise pollution and interference with wildlife habitat.

Figure 6A:
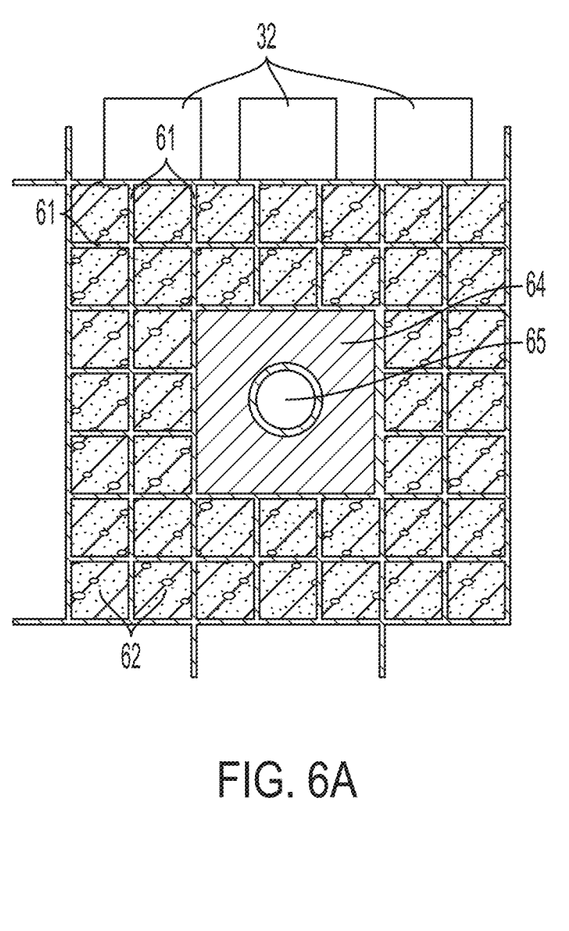
FIG. 6A is a top view of an embodiment of the foundation for supporting the central shaft of the wind system.
Figure 6B:
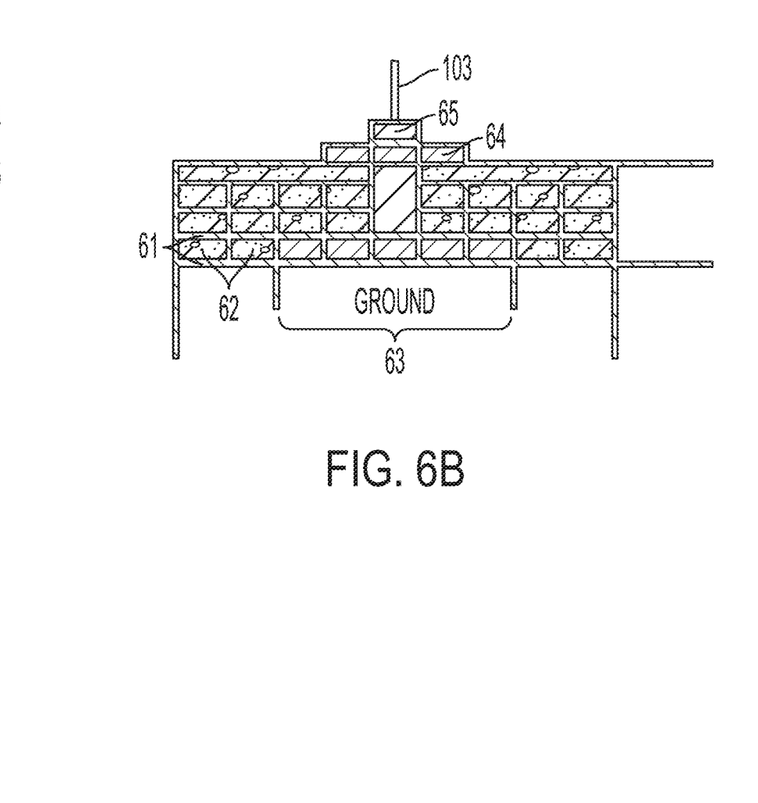
FIG. 6B is a side view of the embodiment of the foundation of FIG. 6A.

As shown in the embodiments of FIGS. 6A and 6B, the central shaft 103 may be supported by a concrete, reinforced structure whereby welded steel rebar 61 (e.g., '¼" rebar) is used to form a 9'-10' square base which extends below the ground surface, to support a concrete structure 62 at the bottom of the base. The concrete structure may, for example, be 4" thick. In the center bottom of the base a first '¼" thick, 5'×5' steel plate 63 is welded to adjacent rebar, and in the top center of the base a second '¼" thick, 3'×3' steel plate 64 is welded to adjacent rebar. Through the center of the plates and the structure is a steel pipe 65 with a 12" outer diameter, being welded to the plates. The steel pipe may have a bearing to receive the central shaft and reduce friction between the shaft and the reinforced structure. Likewise, a bearing 721 supported on the framing 72, aligned with the central shaft, can support the top of the shaft.

Figure 5:
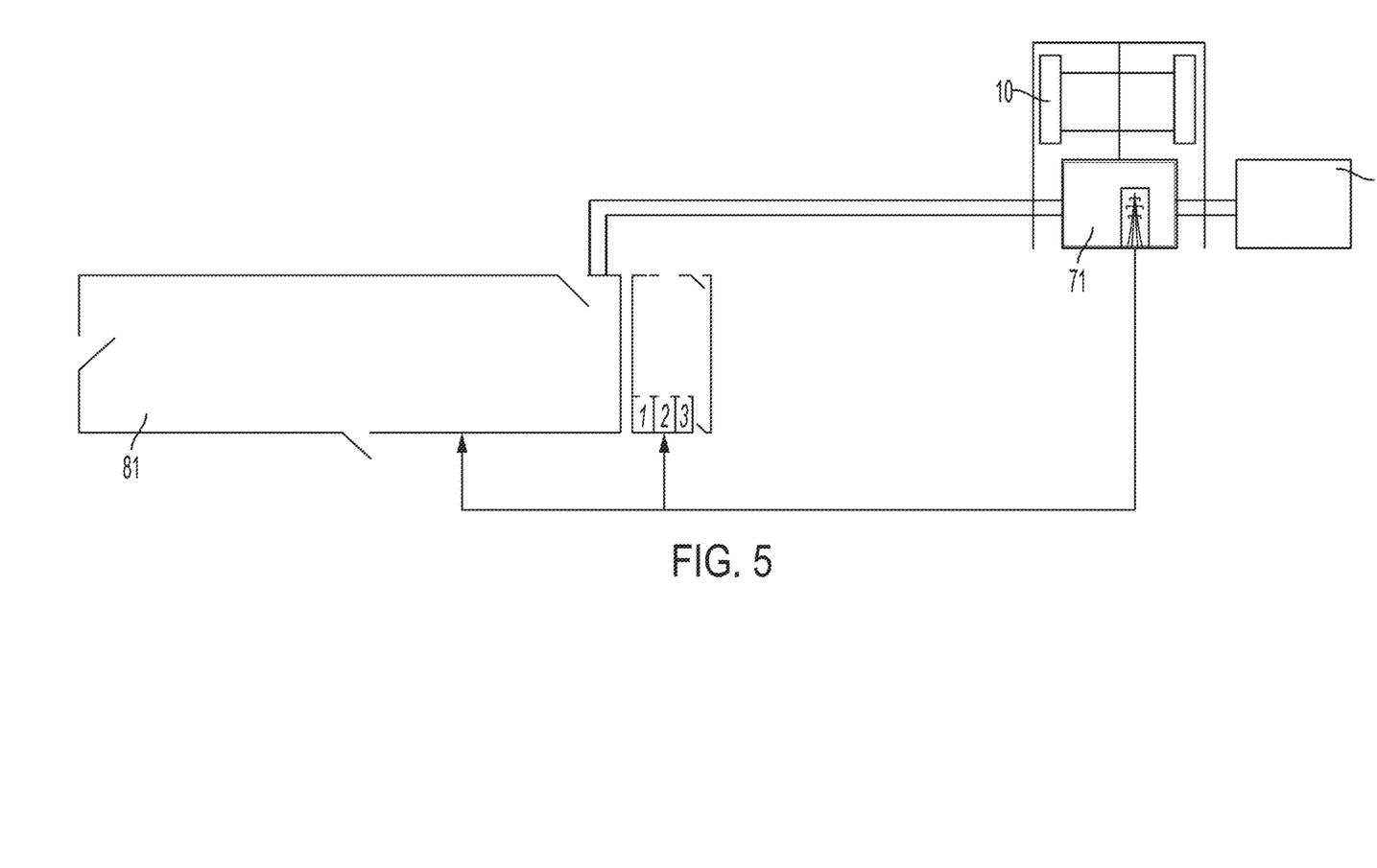
FIG. 5 is a view of an embodiment of the system of the disclosed technology and an adjacent greenhouse.
Figure 8:
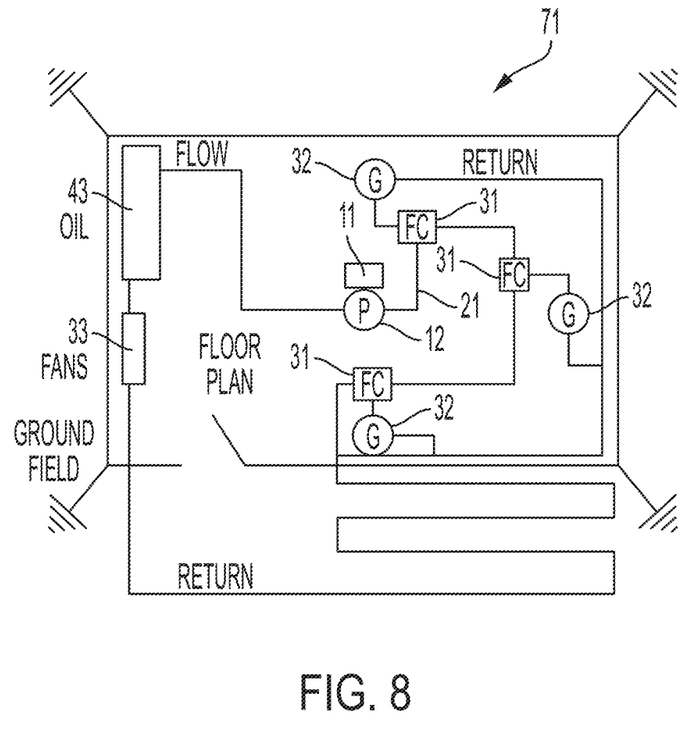
FIG. 8 is a diagram of a floor plan incorporating the hydraulic circuit and generators of the disclosed technology.

As shown in FIGS. 2, 5 and 8, a housing 71 can be built above the shaft support structure to protect the same from weather, and allow an operator to manage the operation of the system. The central shaft 103 of the wind system extends through an aperture in the roof of the housing. Further, a framing system 72 can be provided about the housing and the wind system to support the solar panels above the wind system. In this embodiment, and as shown in the figures, the wind system is supported above ground, to about 60', and the solar panels are supported about 4' above the top of the wind system. Thereby and as herein described, a compact system is provided to capture both solar energy and wind energy, and transform it into three phase electrical energy. Gutters positioned about the roof may capture rain water and deliver it to the water tank; the water tank may have overfill valves to evacuate any excess water. Fireproof spray foam may be applied to the housing structure.

Power generated by the system of the disclosed technology may also be used to operate an adjacent industrial size greenhouse 81 (see, e.g., FIG. 5) for year-round food production. For example, this greenhouse may be a 60'×300' hydroponic growing system. Further, the operation of the generator(s) causes the air about them to increase in temperature. This air may be diverted to the adjacent greenhouse by means of one or more fans and ducts between the generator(s) and the greenhouse, to heat the greenhouse in winter months. In summer months, the heat may be diverted outside of the structure/housing, through an alternate duct system. A switch and solenoid may control a ductwork flap to direct the flow of air to the greenhouse duct system or outside of the structure/housing through the alternate duct system.

Figure 7A:
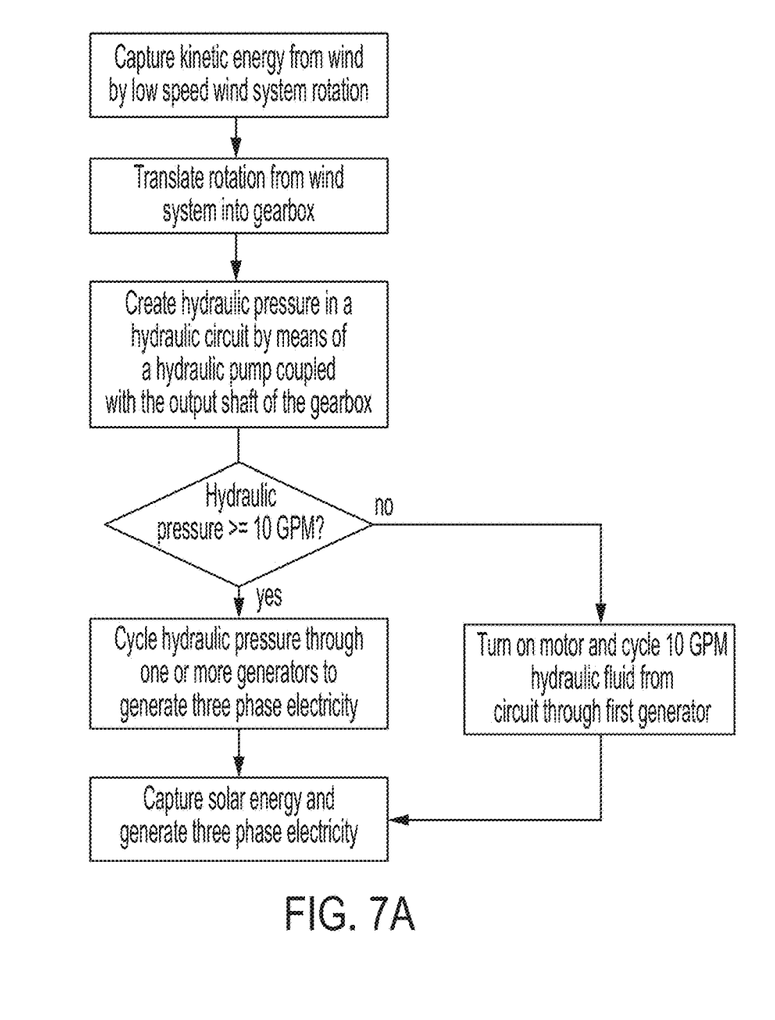
FIG. 7A is a diagram of an embodiment of the method of the disclosed technology.

As herein described and depicted in FIG. 7A, the disclosed technology further provides a method for capturing kinetic and solar energy to generate three phase electricity, the method comprising the steps of: (1) capturing kinetic energy from wind by wind system rotation; (2) translating the rotation from the wind system into a gearbox; (3) creating hydraulic pressure in a hydraulic circuit by means of a hydraulic pump coupled with the output shaft of the gearbox; (4a) if the hydraulic pressure is at least 10 gpm, cycling hydraulic pressure through one or more generators to generate three phase electricity; (4b) if the hydraulic pressure is not at least 10 gpm, turning on a pump motor and drawing 10 gpm hydraulic fluid from the circuit and cycling it through the first generator; and (5) capturing solar energy and generating therefrom three phase electricity.

Figure 7B:
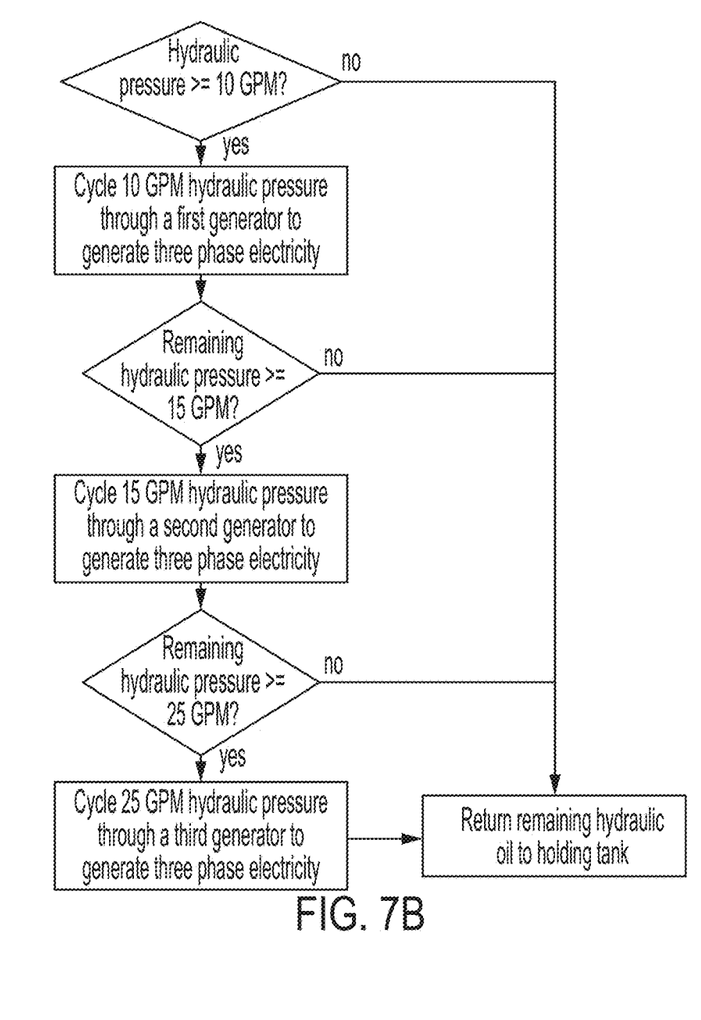
FIG. 7B is a diagram of an embodiment of cycling hydraulic fluid through a plurality of generators in accordance with a method of the disclosed technology.

In the foregoing method, as shown in the exemplary embodiment of FIG. 7B, the hydraulic pressure and fluid may be cycled through three generators, wherein if the hydraulic pressure is greater than 10 gpm, 10 gpm hydraulic pressure is cycled through a first generator to generate three phase electricity; if the remaining hydraulic pressure is at least 15 gpm, 15 gpm hydraulic pressure is cycled through a second generator to generate three phase electricity; and the remaining hydraulic pressure is cycled through a third generator. If at the latter stages (after the first generator) the hydraulic pressure is below a stated target, or in the event there is significant excess hydraulic fluid/pressure remaining after allocation to the third generator, the hydraulic fluid is returned to a holding tank for recycling through the hydraulic circuit. Other target pressure values for the generators may be used.

Figure 10:
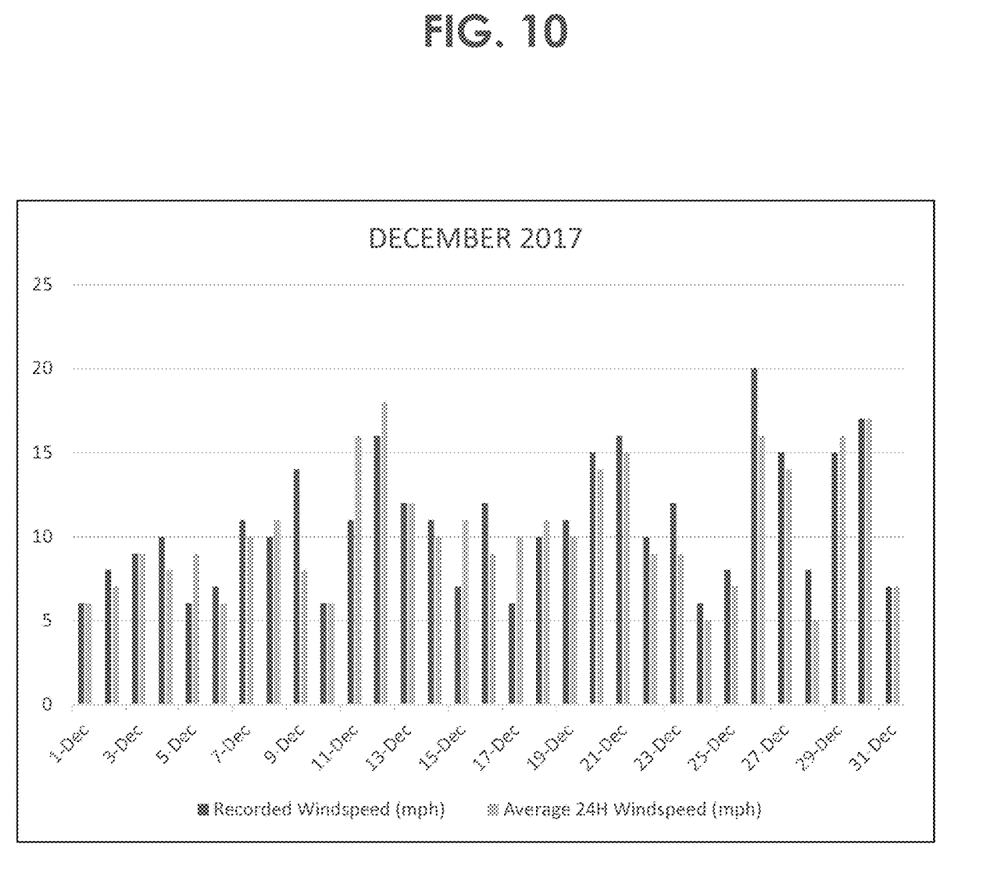
FIG. 10 is a graph showing recorded and average 24 hour wind speeds at a location available to the disclosed technology.

As shown in FIG. 10, the wind system of the disclosed technology may harness wind available at its location, and operate off of the pump motor when wind speed is too low to generate sufficient hydraulic power for purposes of the disclosed technology, as hereinabove described. As shown in the figure, in the time period measured average wind speeds were about 10.35 mph, which produces sufficient hydraulic power to power the generators and generate electricity in embodiments of the disclosed technology. Notably, during high wind speed conditions the wind speed system does not have to be interrupted from power production due to its unique design. Further, in low wind speeds (e.g. <2.5 mph), the system will operate off of the motor, with power supplied thereto from the rechargeable battery, so continuous electricity is generated from the system of the disclosed technology.

Figure 11:
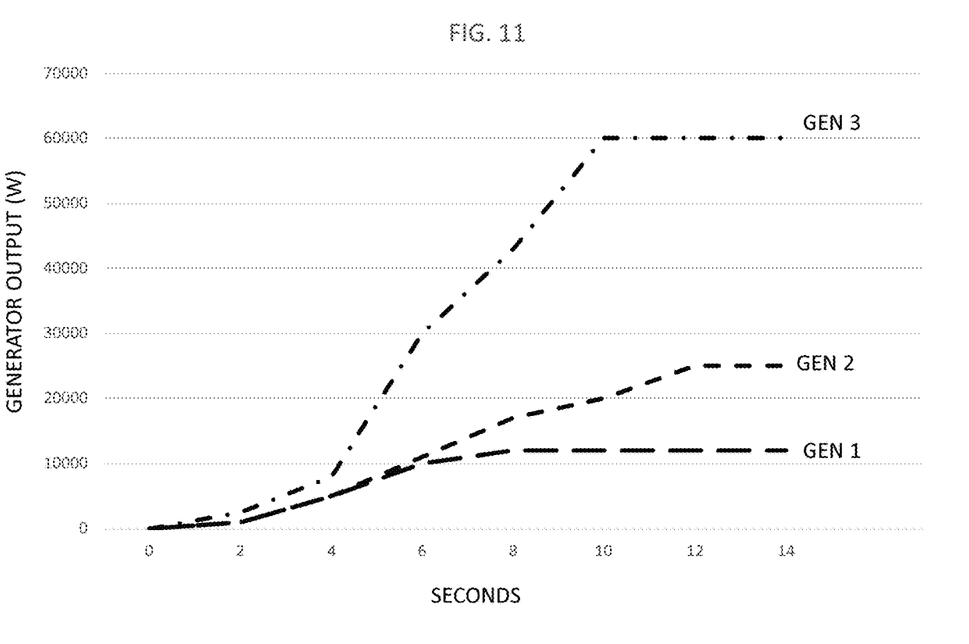
FIG. 11 is a graph showing exemplary output electricity from each of three generators as the system starts up, under wind speed of 14 mph.

FIG. 11 shows exemplary output from the generators of the wind system as herein described, as they startup under wind conditions of 14 mph. As shown in this embodiment, all generators start running at about 2 seconds, and are fully online at about 10 to 12 seconds, the generators collectively producing about 100 KW electricity. Notably, the smaller generators are operating at below full capacity so that they can run 24 hours a day, if the wind conditions allow. Adding a fourth generator to the series of generators in accordance with the invention as herein described would result in additional electricity. In this embodiment, GEN 1 is rated a 20 kw generator, operating at 10 gallons/minute; GEN 2 is rated a 30 kw generator operating at 15 gallons/minute, and GEN 3 is rated a 50 kw generator, operating at 20-25 gallons/minute. As shown, while GEN 3 is rated a 50 kw generator, it may perform at higher output wattage (although the same is not recommended for extended periods of time).

The above-described system can be used to practice this method of the disclosed technology, and the further functionality of the system and its components as hereinabove described may add to and further define the steps of the method as herein described. Therefore, the system disclosure herein provided and the functionality of its components and various combinations thereof are hereby incorporated by this reference into this method of the disclosed technology.

Set forth below is a prophetic example of electric output for a system embodying the inventions herein disclosed, assuming full sunlight for 10 hours and 14 mph winds for 24 hours:

| Generator | Description | kW/Hour | Hours of Operation | Total Daily Output (kW) |
| --- | --- | --- | --- | --- |
| solar array 1 | 10 200 w panels | 20 | 10 | 200 |
| solar array 2 | 10 200 w panels | 20 | 10 | 200 |
| generator 1 | 20 kW generator | 12 | 24 | 288 |
| generator 2 | 30 kW generator | 23 | 24 | 552 |
| generator 3 | 50 kW Generator | 60 | 24 | 1440 |
| | | | | 2680 |

From reading the present disclosure, other variations and modifications will be apparent to persons skilled in the art. Such variations and modifications may involve equivalent and other features which are already known in the art, and which may be used instead of or in addition to features already described herein.

Although claims have been formulated in this application to particular combinations of features, it should be understood that the scope of the disclosure of the present Invention also includes any novel feature or any novel combination of features disclosed herein either explicitly or implicitly or any generalization thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicant hereby gives notice that new Claims may be formulated to such features and/or combinations of such features during the prosecution of the present application or of any further application derived therefrom.

The invention claimed is:

1. A system for transforming kinetic energy from wind energy and solar energy from sunlight into three phase electrical energy, the system comprising:
   a wind system including a plurality of arced plates affixed by spokes to a central shaft, the wind system having an axis of rotation perpendicular to a ground surface, wherein a longitudinal axis of each of the arced plates is parallel with the axis of rotation;
   a gearbox comprising two or more gears, with an output shaft, one of the gears being affixed to the central shaft of the wind system so that as the wind causes the arced plates of the wind system to rotate about the axis of rotation, the rotation produces rotation of the central shaft and the gear to which the shaft is affixed, causing corresponding rotation of at least one other gear of the gearbox and the output shaft which is affixed to one of the other gears of the gearbox;
   a hydraulic pump coupled with the output shaft of the gearbox by which coupling the mechanical power of the shaft rotation is translated into hydraulic pressure within a hydraulic circuit comprising hydraulic fluid;
   at least two generators in series within the hydraulic circuit, which generators receive the hydraulic fluid from the hydraulic pump and generate three phase electricity for transmission to an electrical grid, and a plurality of flow control valves to control the supply and flow pressure of pumped hydraulic fluid to the first generator in the series of generators, with excess fluid being circuited to at least the second generator in the series of generators; and
   a solar panel system generating electrical energy from solar energy, and transmitting the electrical energy to the electrical grid.

2. The system of claim 1 further comprising
   a pump motor coupled with the first generator in the series of generators, to pump hydraulic fluid to the first generator when the hydraulic pressure being supplied by the hydraulic pump is below an operating threshold for the generator, and
   a rechargeable battery system to supply power to the pump motor, wherein the solar panel system diverts electrical energy generated by the solar panel system to the rechargeable battery system when the rechargeable battery system has a charge below a pre-defined threshold.

3. The system of claim 1, the system having three generators, wherein the hydraulic pressure supplied to the first generator in the series of generators is lower than the hydraulic pressure supplied to the second generator, with any remaining hydraulic pressure in the circuit being provided to the third generator.

4. The system of claim 1, further comprising a fan and a heat exchanger coupled with an underground water storage tank, wherein the fan and the heat exchanger are provided to cool the hydraulic fluid in the hydraulic circuit.

5. The system of claim 1, wherein the arced plates of the wind system are made from carbon fiber.

6. The system of claim 5, wherein the arced plates have a thickness of between 7"-9", a width of between 4'-6', a length of between 26'-30', and an arc angle of between 10°-20°.

7. The system of claim 1 further comprising a housing, and a framing positioned about the wind system which supports the solar panels above the housing.

8. The system of claim 1, wherein the wind system has a height of less than 200 feet above ground surface.

9. A system capable of generating three phase electricity from wind, the system comprising:
   a plurality of arced plates affixed by spokes to a central shaft with an axis of rotation perpendicular to the ground surface, and wherein the arced plates are positioned so that each plate's longitudinal axis is parallel with the axis of rotation;
   a gearbox comprising two or more gears, with an output shaft, one of the gears being affixed to the central shaft of the wind system and another gear being affixed to the output shaft so that as the wind causes the arced plates of the wind system to rotate, the rotation of the arced plates produces rotation of the central shaft and the gear to which the central shaft is affixed, causing corresponding rotation of at least one other gear of the gearbox and the output shaft of the gearbox;
   a hydraulic pump coupled with the output shaft of the gearbox by which coupling the mechanical power of the shaft rotation is translated into hydraulic energy within a hydraulic circuit; and
   three generators, which generators receive hydraulic fluid from the hydraulic pump and generate three phase electricity, wherein the generators are in series within the hydraulic circuit and receive the hydraulic fluid from the hydraulic pump and generate three phase electricity for transmission to an electrical grid, and a plurality of flow control valves to control the supply and flow pressure of pumped hydraulic fluid to the first generator in the series of generators, with excess fluid being circuited to at least the second generator in the series of generators.

10. The system of claim 9 further comprising
   a pump motor coupled with the first generator in the series of generators, to pump hydraulic fluid to the first generator when the hydraulic pressure being supplied by the hydraulic pump is below an operating threshold for the generator, and
   a rechargeable battery system to supply power to the pump motor.

11. The system of claim 10 further including a solar panel system to generate electrical energy from solar energy and supply electrical energy generated by the solar panel system to the rechargeable battery system when the battery system has a charge below a pre-defined threshold.

12. The system of claim 9, wherein each of the generators are operable up to a different optimum flow pressure.

13. The system of claim 12, further comprising a fan and a heat exchanger coupled with an underground water storage tank, wherein the fan and the heat exchanger are provided to cool the hydraulic fluid in the circuit.

14. The system of claim 9, wherein the arced plates of the wind system are made from carbon fiber.

15. The system of claim 14, wherein the arced plates have a thickness of between 7"-9", a width of between 4'-6', a length of between 26'-30', and an arc angle of between 10°-20°.

16. The system of claim 9, wherein the system has a height of less than 200 feet above ground.

17. A method of generating electricity, the method comprising the steps of:
   converting kinetic energy from wind into three phase electrical energy by means of a wind system coupled with a gearbox, the gearbox being coupled with a hydraulic pump in a hydraulic circuit, operable to provide hydraulic pressure to at least two generators, wherein the wind system includes a plurality of arced plates affixed by spokes to a central shaft, the system having an axis of rotation perpendicular to the ground surface, and wherein the arced plates are positioned about the central shaft so that the longitudinal axis of each of the arced plates is parallel with the axis of rotation;
   wherein the gearbox comprises two or more gears, with an output shaft, one of the gears being affixed to the central shaft of the wind system and another gear being affixed to the output shaft so that as the wind causes the arced plates of the wind system to rotate, the rotation produces rotation of the central shaft and the gear to which the central shaft is affixed, causing corresponding rotation of at least one other gear of the gearbox and the output shaft of the gearbox;
   wherein the hydraulic pump is coupled with the output shaft of the gearbox by which coupling the mechanical power of the shaft rotation is translated into hydraulic energy within the hydraulic circuit; and
   wherein the generators receive hydraulic fluid from the hydraulic pump and generate three phase electricity, and wherein a plurality of flow control valves are provided to control the supply and flow pressure of pumped hydraulic fluid to the first generator in the series of generators, with excess fluid being circuited to at least the second generator; and
   converting solar energy to electrical energy by means of a solar panel system.

18. The method of claim 17 further comprising the step of:
   capturing a portion of the electrical energy converted by the solar panel system and using the captured electrical energy to charge a rechargeable battery, the rechargeable battery providing electrical power to a pump motor coupled with the first generator to pump hydraulic fluid to the generator when the hydraulic pressure being supplied by the hydraulic pump is below an operating threshold for the first generator.

19. The method of claim 18, further comprising the step of supplying electrical energy generated from the wind system and the solar panel system to machinery of an adjacent greenhouse or other adjacent facility.

* * * * *